United States Patent [19]

Wu

[11] Patent Number: 5,933,477
[45] Date of Patent: Aug. 3, 1999

[54] CHANGING-URGENCY-DEPENDENT MESSAGE OR CALL DELIVERY

[75] Inventor: Charles C. Wu, Broomfield, Colo.

[73] Assignee: Lucent Technologies Inc., Murray Hill, N.J.

[21] Appl. No.: 08/787,465

[22] Filed: Jan. 22, 1997

[51] Int. Cl.⁶ .................................................... H04M 1/64
[52] U.S. Cl. ...................... 379/88.26; 379/211; 455/413; 455/418
[58] Field of Search ................................ 379/67.1, 88.22, 379/88.23, 88.24, 88.25, 88.26, 201, 211, 212; 455/412, 413, 414, 418, 426

[56] References Cited

U.S. PATENT DOCUMENTS

| 4,330,857 | 5/1982 | Alvarez, III et al. | 370/104 |
| 4,885,780 | 12/1989 | Gopal et al. | 379/221 |
| 5,153,905 | 10/1992 | Bergeron et al. | 379/88.23 |
| 5,333,180 | 7/1994 | Brown et al. | 379/79 |
| 5,369,745 | 11/1994 | Faber | 395/200 |

*Primary Examiner*—Fan S. Tsang
*Attorney, Agent, or Firm*—David Volejnicek

[57] ABSTRACT

Communications (e.g., messages or calls) are treated with increasing urgency as their "expiration" time approaches. An expiration time is specified (FIG. 2 or 3) for a communication by its originator or some other entity and may be content-determined. Delivery of the communication to a recipient (e.g., an addressee or an agent of the addressee) is then attempted (FIG. 5) according to instructions (604–608) specified (FIG. 4) by the recipient (602). Each instruction corresponds to a different interval of time (612) prior to the expiration time of communications. During each present time interval prior to the expiration time that is associated with a communication, delivery of an undelivered said communication is attempted according to the delivery instruction that corresponds to the present time interval (FIG. 5). This technique can be combined with a priority-based delivery technique: each time interval prior to the expiration time may have a different priority (610) associated therewith, and the communication may also have an associated priority, whereupon the delivery is attempted either according to the instruction that corresponds to the priority that is associated with the present time interval prior to the expiration time or according to the instruction that corresponds to the higher one of the priority associated with the present time interval and with the communication.

9 Claims, 4 Drawing Sheets

| 600 | 538-4154 JOHN DOE | | |
|---|---|---|---|
| 602 | | | |
| 604 | 0 | > 24 HRS | SET MESSAGE-WAITING INDICATOR |
| 605 | 1 | 8-24 HRS | DISTRIBUTE MESSAGE TO OTHER ADDRESSEE MAILBOXES; SEND E-MAIL |
| 606 | 2 | 2-8 HRS | PAGE ADDRESSEE; ACTIVATE CALL-WAITING |
| 607 | 3 | .5-2 HRS | OUTCALL TO ADDRESSEE'S TELEPHONE AND SECRETARY'S TELEPHONE |
| 608 | 4 | 0-.5 HRS | OUTCALL TO ADDRESSEE'S CELLULAR PHONE |

FIG. 6

| ADDRESSEE | | |
|---|---|---|
| PRIORITY 610 | TIME TO EXPIRATION RANGE 612 | DELIVERY INSTRUCTIONS 614 |
| ⋮ | ⋮ | ⋮ |
| 610 | 612 | 614 |

FIG. 7

| 538-4154  JOHN DOE | | |
|---|---|---|
| 0 | > 24 HRS | SET MESSAGE-WAITING INDICATOR |
| 1 | 8-24 HRS | DISTRIBUTE MESSAGE TO OTHER ADDRESSEE MAILBOXES; SEND E-MAIL |
| 2 | 2-8 HRS | PAGE ADDRESSEE; ACTIVATE CALL-WAITING |
| 3 | .5-2 HRS | OUTCALL TO ADDRESSEE'S TELEPHONE AND SECRETARY'S TELEPHONE |
| 4 | 0-.5 HRS | OUTCALL TO ADDRESSEE'S CELLULAR PHONE |

CHANGING-URGENCY-DEPENDENT MESSAGE OR CALL DELIVERY

TECHNICAL FIELD

This invention relates generally to communications systems, and particularly to systems for communicating dated material, such as messaging systems.

BACKGROUND OF THE INVENTION

There are types of communications—messages or calls—that need to be treated with increasing urgency as they get older. For example, a message may contain dated material, such as a meeting announcement to an intended meeting participant, and its delivery to the intended meeting participant becomes ever-more urgent until the time of the meeting, at which time it becomes outdated and its delivery becomes unnecessary. Another example is timely subscription information which may be outdated by newer information, such as stock quotes.

Conventional messaging systems allow the message originator to indicate whether or not the message is a priority message, and notify the message recipient of the existence of any priority messages when the recipient accesses his or her mailbox. However, this does not address the need to treat some messages or calls with increasing urgency as they get older, e.g., as a certain time approaches.

SUMMARY OF THE INVENTION

This invention is directed to solving these and other problems and meeting the needs of the art. Generally according to the invention, a plurality of communication delivery instructions are provided for communications (e.g., messages or calls), each instruction corresponding to a different interval of time prior to an expiration of a communication, and an expiration time is associated with a communication. Then, during each present said time interval prior to the expiration time associated with the communication, delivery is attempted of an undelivered said communication to a recipient of said communication according to the delivery instruction that corresponds to the present time interval. Advantageously, this scheme allows communications to be treated with different (e.g., increasing) urgency as a certain ("expiration") time approaches.

According to one aspect of the invention, the delivery instructions are provided by an addressee of the communication, the expiration time is associated with the communication by its originator, and the instructions are used to attempt delivery of the communication to the addressee. Advantageously, this permits the party most knowledgeable about the communication's content—its originator—to specify its expiration time, but permits the party most affected by the communication's content—its addressee—to specify how he or she wants the communication delivered as its urgency increases.

According to another aspect of the invention, each delivery instruction corresponds to a different priority and each priority corresponds to a different time interval, and an attempt at delivery of the undelivered communication to the recipient is made according to the delivery instruction that corresponds to the priority that corresponds to the present time interval. This advantageously facilitates incorporation of the invention in arrangements that already treat communications in the order of their priorities.

According to a further aspect of the invention, each provided delivery instruction corresponds both to a different interval of time prior to the expiration time and to a different priority, and a communication has both an expiration time and a priority associated therewith. Then, delivery of the undelivered communication is attempted according to the higher one of the priority that corresponds to the delivery instruction that corresponds to the present time interval, and the priority associated with the communication. Advantageously, a communication can thus be delivered according to whichever one of a plurality of different schemes indicate a highest urgency of the communication.

These and other advantages and features of the invention will become more apparent from the following description of an illustrative embodiment of the invention considered together with the drawing.

BRIEF DESCRIPTION OF THE DRAWING

FIG. 6 is a block diagram of a message-delivery instructions data structure of the messaging system; and FIG. 7 is a block diagram of the data structure of FIG. 6 populated with illustrative data.

DETAILED DESCRIPTION

Figure 1:
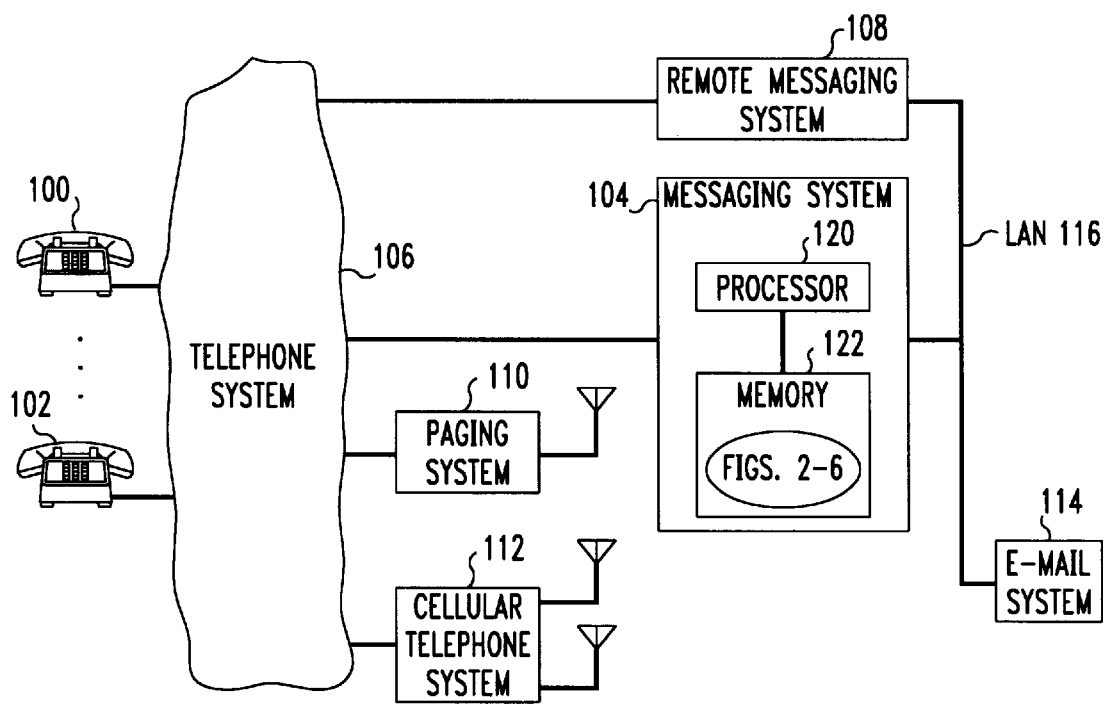
FIG. 1 is a block diagram of a telecommunications system that includes an illustrative embodiment of the invention.

FIG. 1 shows a telecommunications system that comprises a plurality of telephones 100–102, messaging systems 104 and 108, a paging system 110, and a cellular telephone system 112, interconnected by a telephone system 106. Messaging systems 104 and 108 are further interconnected with each other and with an e-mail system 114 by a local area network (LAN) 116. As described so far, the telecommunications system of FIG. 1 is conventional.

Messaging system 104 is a stored-program-controlled messaging system, such as the Lucent Technologies Inc. Intuity® messaging system. It includes a processor 120 for executing programs, and a memory 122 for storing programs and data for execution and use by processor 120 and for implementing message mailboxes for subscribers of the messaging service. Included among programs and data stored by memory 122 are programs which implement the functions of FIGS. 2–5 and data structures which are represented by the one shown in FIG. 6.

According to the invention, messages are treated by messaging system 104 with increasing urgency as they approach their expiration time. For this purpose, each subscriber of the messaging service provided by messaging system 104 has his or her own data structure 600, shown in FIG. 6, for storing message-delivery instructions. Data structure 600 contains a plurality of entries 602–608. Entry 602 identifies the message addressee—the subscriber—to whom data structure 600 corresponds. Entries 604–608 define the message delivery instructions for the addressee. Each entry 604–608 contains a plurality of fields 610–614. Priority field 610 indicates the message priority level to which that entry 604–608 corresponds. A time-to-expiration range field 612 indicates the time interval prior to expiration of a message's usefulness to which interval that entry 604–608 corresponds. And delivery instructions field 614 defines the delivery instructions for messages that either have that entry's corresponding priority or presently fit within that entry's time-to-expiration range.

A data structure 600 populated with illustrative data is shown in FIG. 7. Addressee entry 602 contains the telephone number and name of the corresponding subscriber as that subscriber's identifiers. A first instruction entry 604 corresponds to messages having either a lowest priority (0) or a time-to-expiration of more than 24 hours. The delivery instructions for such messages are to set a message-waiting indicator—for example, turn on a message waiting light at the addressee's telephone—to advise the addressee of the messages' existence, as is conventional. A second instruction entry 605 corresponds to messages having either a low priority (1) or a time-to-expiration of between 8 and 24 hours. The delivery instructions for such messages are to replicate and broadcast the messages to any mailboxes of the subscriber in other messaging systems 108 and also to send the messages to the subscriber as e-mail via e-mail system 114. A third instruction entry 606 corresponds to messages having either a medium priority (2) or a time-to-expiration of between 2 and 8 hours. The delivery instructions for such messages are to page the addressee via paging system 110 and also to activate call-waiting for the addressee such that, along with every call answered by the addressee, the addressee gets a notification—a special tone or a prerecorded message—of the messages' existence. A fourth instruction entry 607 corresponds to messages having either a high priority (3) or a time-to-expiration of between one-half hour and two hours. The delivery instructions for such messages are to call the addressee at the addressee's telephone number and deliver the message, and also to call the addressee's secretary (or some other alternative destination) and deliver the message. A fifth instruction entry 608 corresponds to messages having either a highest priority (4) or a time-to-expiration of less than one-half hour. The delivery instructions for such messages are to call the addressee at the addressee's cellular phone (or other portable communication device) number and deliver the message. As can be seen from this example, the delivery instructions become evermore intrusive upon the addressee as the urgency of the message increases.

Data contents of a data structure 600 are defined by the subscriber to whom that data structure 600 corresponds. To populate data structure 600 with data, a subscriber accesses his or her mailbox in message system 104 in a conventional manner and selects delivery-instructions creation from the mailbox menu, at step 400 of FIG. 4. In response, messaging system 104 prompts the subscriber for delivery-instructions data and populates fields 610–614 of entries 604–608 with the received data, at step 402. When the subscriber indicates that he or she is done creating delivery instructions, messaging system 104 ends the procedure, at step 404, and returns the subscriber to the mailbox menu.

Figure 2:
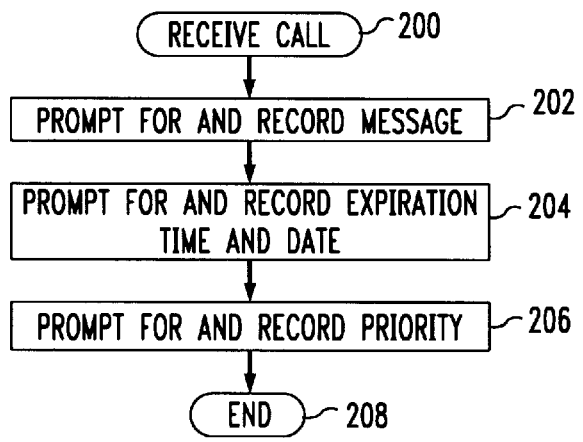
FIG. 2 is a functional flow diagram of message-creation operations of a messaging system of the telecommunications system of FIG. 1 for a redirected call.

The subscriber can generally receive messages as a consequence of two scenarios. One is a redirected-call scenario, where a call directed to the subscriber is not answered and is redirected to messaging system 104. This scenario is shown in FIG. 2. The other scenario is a message-sending scenario, where a message sender creates a message for the subscriber in the sender's own mailbox and then sends the message to the subscriber's mailbox. This scenario is shown in FIG. 3.

Turning to FIG. 2, upon receiving the redirected call, at step 200, messaging system 104 prompts the caller to record a message for the subscriber and stores it in the subscriber's mailbox, at step 202. Messaging system 104 also prompts the caller to indicate, if desired, an expiration date and time for the message, and records any entered expiration date and time with the message, at step 204. Messaging system 104 also prompts the caller to indicate, if desired, a priority level for the message, and records any entered priority level with the message, at step 206. When the caller hangs up, messaging system 104 ends the message-creation procedure, at step 208.

Figure 3:
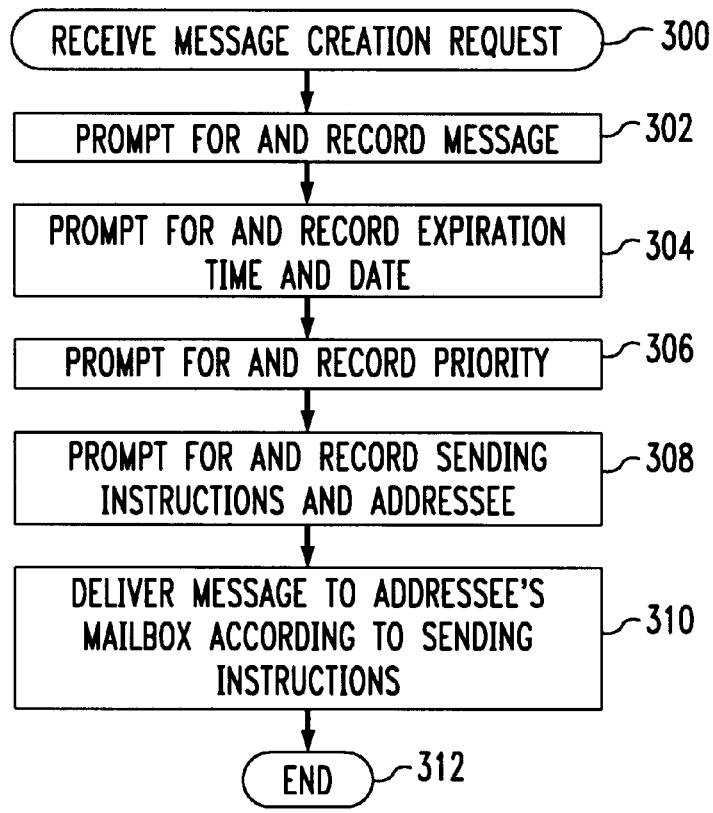
FIG. 3 is a functional flow diagram of message-creation operations of the messaging system for a message-sending call.
Figure 4:
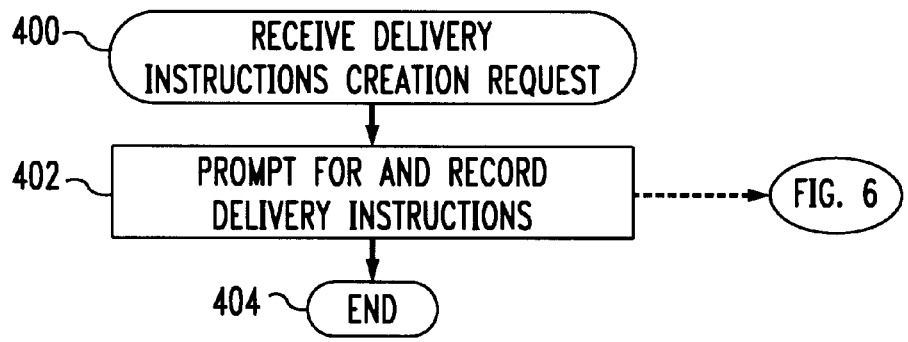
FIG. 4 is a functional flow diagram of message-delivery instructions-creation operations of the messaging system.

Turning to FIG. 3, when a messaging service subscriber who wishes to send a message to another subscriber accesses his or her own mailbox and selects message creation from the mailbox menu, at step 300, messaging system 104 prompts the sending subscriber for a message and records it in the sending subscriber's mailbox, at step 302. Messaging system 104 also prompts the sending subscriber to indicate, if desired, an expiration date and time for the message, and records any entered expiration date and time with the message, at step 304. Messaging system 104 also prompts the sending subscriber to indicate, if desired, a priority level for the message, and records any entered priority level with the message, at step 206. Finally, messaging system 104 prompts the sending subscriber for any sending instructions for the message—the time at which the message should be delivered to the addressee's mailbox, for example—and the addressee's identifier—telephone number, for example—and stores this information in association with the message, at step 308. Finally, messaging system 104 sends the message and its associated information to the addressee's mailbox according to any received sending instructions, at step 310. Messaging system then ends the message creation and sending procedure, at step 312.

Figure 5:
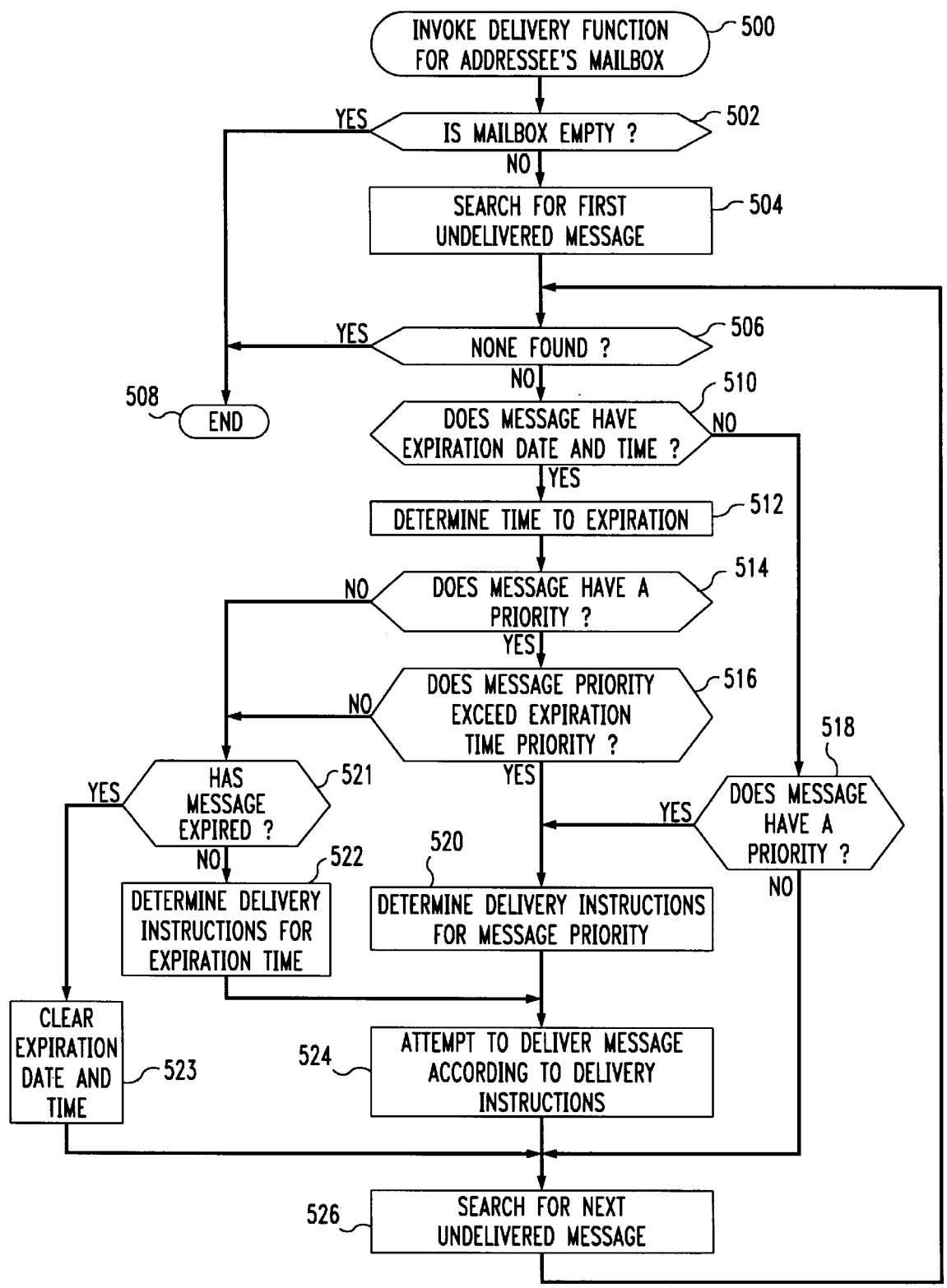
FIG. 5 is a functional flow diagram of message-delivery operations of the messaging system.

A message-delivery function is periodically executed by messaging system 104 for each subscriber's mailbox. This function is shown in FIG. 5. When the function is invoked for a mailbox of a particular subscriber/addressee, at step 500, messaging system 104 first checks if that mailbox is empty, at step 502. If so, there is nothing to deliver, and execution of the message-delivery function ends, at step 508. If the mailbox is not empty, messaging system 104 searches it for any message that is conventionally marked as undelivered, at step 504. If an undelivered message is not found, as determined at step 506, the execution of the message-delivery function again ends, at step 508. If an undelivered message is found, messaging system 104 checks whether the message has an associated expiration date and time, at step 510. If the message does not have an associated expiration date and time, messaging system 104 checks whether the message has an associated priority, at step 518. If the message does not have an associated priority, messaging system 104 ends delivery processing of this message and proceeds to step 526 to search the addressee's mailbox for a next undelivered message. But if the message does have an associated priority, messaging system 104 compares the message priority against priority fields 610 of entries 604–608 in the addressee's data structure 600 to find the corresponding delivery instructions, at step 520.

Returning to step 510, if the message does have an associated expiration date and time, messaging system 104 determines the time-to-expiration interval of the message by computing the difference between the present time and the message's associated expiration date and time, at step 512. Messaging system 104 also checks whether the message has an associated message priority, at step 514. If the message does have an associated message priority, messaging system 100 compares the determined time-to-expiration interval against fields 612 of entries 604–608 in data structure 600 to find the corresponding priority field 610 and compares the contents of that field 610 with the message's associated priority, at step 516. If the message's priority is higher than the priority which corresponds to the message's time-to-expiration interval, messaging system 104 compares the message's priority against fields 610 of entries 604–608 in data structure 600 to find the corresponding delivery instructions, at step 520.

Returning to steps 514 and 516, if it is determined at step 514 that the message does not have an associated message priority or if it is determined at step 516 that the message's priority is higher than the priority which corresponds to the message's time-to-expiration interval, messaging system 104 checks whether the message has expired, that is, whether the time to expiration that was determined at step 512 is less than or equal to zero, at step 521. If the message has expired, messaging system 104 clears the expiration date and time that accompanied the message, at step 523. If the message has not expired, messaging system 104 compares the determined time-to-expiration interval against time-to-expiration range fields 612 of entries 604–608 in the addressee's data structure 600 to find the corresponding delivery instructions, at step 522.

Following step 520 or 522, messaging system 104 uses whatever delivery instructions it obtained at step 520 or 522 and attempts message delivery according to those instructions, at step 524. If and when the delivery actually succeeds, in that the addressee retrieves (accesses) the message, the message is marked as delivered in the addressee's mailbox in messaging system 104.

Following step 523 or step 524, messaging system 104 searches the addressee's mailbox for a next undelivered message, at step 526, and then returns to step 506.

Of course, various changes and modifications to the illustrative embodiment described above will be apparent to those skilled in the art. For example, messages and entries in the delivery-instructions data structure need not have associated priorities, in which case the delivery instructions are determined only by a message's time-to-expiration. Or the procedures of FIGS. 4 and 5 and the data structure of FIG. 6 can be used to deliver calls to agents in a call center, where there is one data structure of FIG. 6 for all enqueued call-center calls, which data structure is populated with data by an administrator of the call center, with the time-to-expiration range fields having values of minutes and seconds and the corresponding delivery instructions in each case being to treat the call as having the corresponding priority. Upon arrival, each call center call is automatically assigned an expiration date and time and the procedure of FIG. 5 searches call queues for calls, which calls are then removed from queues when being delivered to agents. Steps 521 and 523 are omitted for the call center calls—"expired" calls are treated as highest-priority calls. Or, the priority/aging system applies to call centers in that it can augment traditional time-in-queue scheduling with special priority mechanisms (such as "preferred member" or "gold club"). If a waiting call's assigned expiration time expires, the caller can be asked to leave a message or be automatically played an ameliorative message, such as an offer of compensation for waiting too long. In short, a richer scheduling system is created using the orthogonal time priority and assigned priority. Such changes and modifications can be made without departing from the spirit and the scope of the invention and without diminishing its attendant advantages. It is therefore intended that such changes and modifications be covered by the following claims.

The invention claimed is:

1. A method of communicating, comprising the steps of:

storing a plurality of communication delivery instructions, each instruction corresponding to a different time interval of time prior to an expiration time of a communication;

associating a particular time as the expiration time with a particular communication; and during each present said time interval prior to the particular time associated with the particular communication, attempting to deliver an undelivered said particular communication to a recipient of said particular communication according to the delivery instruction that corresponds to the present time interval.

2. The method of claim 1 wherein:

the step of storing comprises the step of
storing the plurality of communication delivery instructions of an addressee of communications;

the step of associating comprises the step of
receiving the particular time with the particular communication from an originator of the particular communication for the addressee; and the step of attempting to deliver comprises the step of
attempting to deliver the undelivered particular communication to the addressee according to the delivery instruction that corresponds to the present time interval.

3. The method of claim 1 wherein:

the step of storing comprises the step of
storing a plurality of communication delivery instructions each corresponding to a different priority and each said priority corresponding to s a different said interval of time; and the step of attempting to deliver comprises the step of
attempting to deliver the undelivered particular communication to the recipient according to the delivery instruction that corresponds to the priority that corresponds to the present time interval.

4. The method of claim 1 wherein:

each stored delivery instruction corresponds both to a different interval of time prior to the expiration time and to a different priority;

the step of associating comprises the step of
associating the particular time and a priority with the particular communication; and the step of attempting to deliver comprises the steps of
attempting to deliver the undelivered particular communication to the recipient according to the delivery instruction that corresponds to the present time interval, if the priority associated with the particular communication does not exceed the priority that corresponds to the present time interval, and attempting to deliver the undelivered particular communication to the recipient according to the delivery instruction that corresponds to the priority associated with the particular communication, if the priority that corresponds to the present time interval does not exceed the priority associated with the particular communication.

5. An apparatus that effects the method of claim 1 or 2 or 3 or 4.

6. A communications apparatus comprising:

an arrangement for storing a plurality of communication delivery instructions, each instruction corresponding to a different time interval of time prior to an expiration time of a communication; and a delivery arrangement connected to the storing arrangement and responsive to a particular communication having a particular time associated therewith as the expiration time, during each present time interval prior to the particular time, by attempting to deliver an undelivered said particular communication to a recipient of said particular communication according to the delivery instruction that corresponds to the present time interval.

7. The apparatus of claim 6 wherein:

the storing arrangement stores a plurality of communication delivery instructions provided by an addressee of communications;

the particular time associated as the expiration time with the particular communication is provided by an originator of the Particular communication; and the delivery arrangement attempts to deliver the undelivered particular communication to the addressee according to the delivery instruction that corresponds to the present time interval.

8. The apparatus of claim 6 wherein:

each instruction stored by the storing arrangement corresponds to a different priority and each said priority corresponds to a different said interval of time; and the delivery arrangement attempts to deliver the undelivered particular communication to the recipient according to the delivery instruction that corresponds to the priority that corresponds to the present time interval.

9. The apparatus of claim 6 wherein:

each instruction stored by the storing arrangement corresponds both to a different interval of time prior to the expiration time and to a different priority; and the delivery arrangement is responsive during each present said time interval prior to the expiration time of the particular communication to the particular communication having both the associated particular time and an associated priority, by attempting to deliver the undelivered particular communication to the recipient according to the delivery instruction that corresponds to the present time interval if the priority associated with the particular communication does not exceed the priority that corresponds to the present time interval, and by attempting to deliver the undelivered particular communication to the recipient according to the delivery instruction that corresponds to the priority associated with the particular communication if the priority that corresponds to the present time interval does not exceed the priority associated with the particular communication.

* * * * *